(12) United States Patent
Park et al.

(10) Patent No.: US 7,350,607 B2
(45) Date of Patent: Apr. 1, 2008

(54) ELECTRICAL POWER GENERATION

(75) Inventors: Sung K. Park, Newton Center, MA (US); David E. Duncanson, West Newbury, MA (US); John M. O'Fallon, Lowell, MA (US)

(73) Assignee: Umagination Labs, L.P., Newton, MA (US)

( * ) Notice: Subject to any disclaimer, the term of this patent is extended or adjusted under 35 U.S.C. 154(b) by 246 days.

(21) Appl. No.: 11/197,023

(22) Filed: Aug. 4, 2005

(65) Prior Publication Data

US 2006/0032687 A1    Feb. 16, 2006

Related U.S. Application Data (60) Provisional application No. 60/599,360, filed on Aug. 6, 2004.

(51) Int. Cl.
*B62M 23/02* (2006.01)

(52) U.S. Cl. .................. 180/65.5; 180/65.1; 180/19.1; 280/37

(58) Field of Classification Search ................ 180/342, 180/343, 65.1, 65.5, 65.6, 19.1, 19.3; 280/37, 280/654, 655, 655.1, 47.17, 47.26
See application file for complete search history.

(56) References Cited

U.S. PATENT DOCUMENTS

| | | | |
|---|---|---|---|
| 3,946,839 A | 3/1976 | Butler | |
| 4,325,108 A | 4/1982 | Spingler | |
| 4,391,340 A * | 7/1983 | DeLorean | 180/400 |
| 4,405,872 A | 9/1983 | Thomas | |
| 4,418,776 A | 12/1983 | Weirick | |
| 4,429,232 A | 1/1984 | Thomas et al. | |
| 4,531,605 A | 7/1985 | Scholz et al. | |
| 4,539,497 A | 9/1985 | Boyer | |
| 4,728,937 A | 3/1988 | Hsu | |
| 4,913,252 A * | 4/1990 | Bartley et al. | 180/208 |
| 4,973,952 A | 11/1990 | Malec et al. | |
| 5,071,117 A | 12/1991 | Mautner et al. | |
| 5,184,110 A | 2/1993 | Horng | |
| 5,205,801 A | 4/1993 | Haner | |
| 5,316,096 A * | 5/1994 | Good | 180/19.1 |
| 5,500,636 A | 3/1996 | Mitchell | |
| 5,536,026 A | 7/1996 | Pozzobon et al. | |

(Continued)

FOREIGN PATENT DOCUMENTS

GB    2257873    1/1993

(Continued)

OTHER PUBLICATIONS

11/185,316 filed Jul. 20, 2005, entitled "Suspensions for Wheeled Transport Devices".

(Continued)

*Primary Examiner*—Christopher P. Ellis
*Assistant Examiner*—Brian Swenson
(74) *Attorney, Agent, or Firm*—Fish & Richardson P.C.

(57) ABSTRACT

A wheeled transport device, such as a piece of luggage configured to be manually wheeled by a pedestrian user, in provided with an electrical generator operably coupled to a rolling wheel of the device and configured to produce electrical energy as the user wheels the device along a supporting surface. The generator provides power to charge a battery contained within the device and/or one or more electrical appliances being transported within the device.

28 Claims, 7 Drawing Sheets

U.S. PATENT DOCUMENTS

| | | |
|---|---|---|
| 6,273,205 B1 * | 8/2001 | Tsai ................... 180/181 |
| 6,291,901 B1 | 9/2001 | Cefo |
| 6,337,528 B1 | 1/2002 | Jung |
| 6,396,178 B1 | 5/2002 | Chiu |
| 6,502,656 B2 * | 1/2003 | Weiss et al. ............ 180/168 |
| 6,592,240 B2 * | 7/2003 | Camarota et al. ........ 362/399 |
| 6,674,190 B2 | 1/2004 | Chen |
| 6,688,636 B2 | 2/2004 | Han |
| 6,769,588 B2 | 8/2004 | Zheng |
| 6,822,357 B2 | 11/2004 | Hung |
| 2002/0171213 A1 | 11/2002 | Kim |
| 2003/0112128 A1 | 6/2003 | Littlechild et al. |
| 2003/0234515 A1 | 12/2003 | Han |
| 2004/0246096 A1 | 12/2004 | Queenan |
| 2004/0246097 A1 | 12/2004 | Queenan |

OTHER PUBLICATIONS

International Search Report, PCT/US05/27823, dated Jan. 27, 2006.

* cited by examiner

ELECTRICAL POWER GENERATION

CROSS-REFERENCE TO RELATED APPLICATIONS

This application claims the benefit of U.S. Provisional Application No. 60/599,360, filed Aug. 6, 2004 and entitled "Electrical Power Generation," which is incorporated by reference herein.

TECHNICAL FIELD

This invention relates to luggage and other personal, totable or wheeled containers for transporting personal effects.

BACKGROUND

Business travelers are frequently found in airports or other public spaces, hunting for available electrical power outlets to power or recharge portable electronic equipment, such as laptops, cell phones and the like, or hovering around such outlets waiting for rechargeable equipment to fully recharge, wasting otherwise useful time.

There is frequently a need for electrical power when such outlets are unavailable.

SUMMARY

In several aspects, this invention features a wheeled suitcase, luggage or other personal, totable or wheeled containers for transporting personal effects, provided with an electrical generator coupled to at least one of its rolling wheels, either directly or indirectly, for transforming a portion of the energy supplied by the user in pulling or pushing the device into usable electrical energy.

According to one aspect of the invention, a wheeled transport device configured to be manually wheeled by a pedestrian user includes a main body defining a compartment therein for containing goods to be transported, a handle attached to the main body and manually graspable by the pedestrian user while walking, at least one wheel disposed at a lower end of the main body and secured to the body for rotation along a surface upon which the user is walking, and an electrical generator operably coupled to the wheel and configured to produce electrical energy as the user wheels the device along the surface.

In many embodiments, the device also includes an electrical power outlet secured to the main body, electrically connected to the generator, and exposed for connection of an electrically powered device by the user. In some cases the outlet is accessible from within the main body compartment, such as for plugging in luggage contents for charging.

In some cases, the device further includes a battery secured to the main body and electrically connected to the generator for storage of electrical energy from the generator.

In some configurations, the generator is operably coupled to the wheel by a flexible cable. In some other configurations, the generator contains an armature directly coupled to, and coaxial with, the wheel. In some instances, the generator is operably coupled to the wheel through a pair of engaged gears, or is driven by a roller directly engaging a surface of the wheel. In the latter case, the device may also include a spring biasing the roller against the wheel surface. Thus, the generator can be attached to the drive wheel in many ways, including but not limited to: a rigid axle that rotates with the wheel, a flexible shaft, a direct drive gear, or a wheel that runs directly from the rotating wheel of the transport device. Alternatively, the wheel itself may be configured as a generator, with the hub assembly of the wheel acting as the rotor of the generator and the outer revolving wheel the windings of the generator.

In many advantageous embodiments, the device is a piece of wheeled luggage, such as a wheeled suitcase. However, other sorts of wheeled transport devices, such as carts or wheelbarrows, are contemplated.

In some cases, the main body includes a hinged lid for accessing contents contained within the compartment.

An on/off switch may be provided, the switch manually operable to selectively open the windings of the generator to disable power generation and reduce drag on the rolling wheel when electrical power is not needed.

Another aspect of the invention features the above-described wheeled transport device in combination with a personal electrical appliance contained within the compartment and electrically connected to the generator.

Another aspect of the invention features a method of powering personal electrical appliances. The method includes providing the above-described wheeled transport device, electrically connecting a personal electrical appliance to the generator of the device, and rolling the device along a surface to generate and deliver electrical power to the connected appliance.

Various aspects of this invention can provide a complimentary function to the transport device, by transforming user energy into useful electrical energy. This additional function is particularly useful to business travelers when incorporated into wheeled luggage, but can find utility in other areas, such as operator-pulled machinery and the like.

The generator may directly power a device, or may charge an onboard battery, so that the device may operate while the cart is at rest.

This invention can make use of untapped energy produced by a human when pushing or pulling a suitcase or wheeled cart. The energy needed to power or charge many portable electronic devices is typically only a small fraction of the energy needed to move the wheeled cart. The addition of an appropriate generator/charger to a human-powered push/pull cart would thus require a negligible amount of extra energy from the user. This extra energy could be manually or automatically adjusted to the user's preferences. Tapping into this energy can allow rechargeable personal accessories to be kept in a charged state without requiring the user to find an electrical outlet in a public place such as an airport, and then waiting for the device to recharge.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
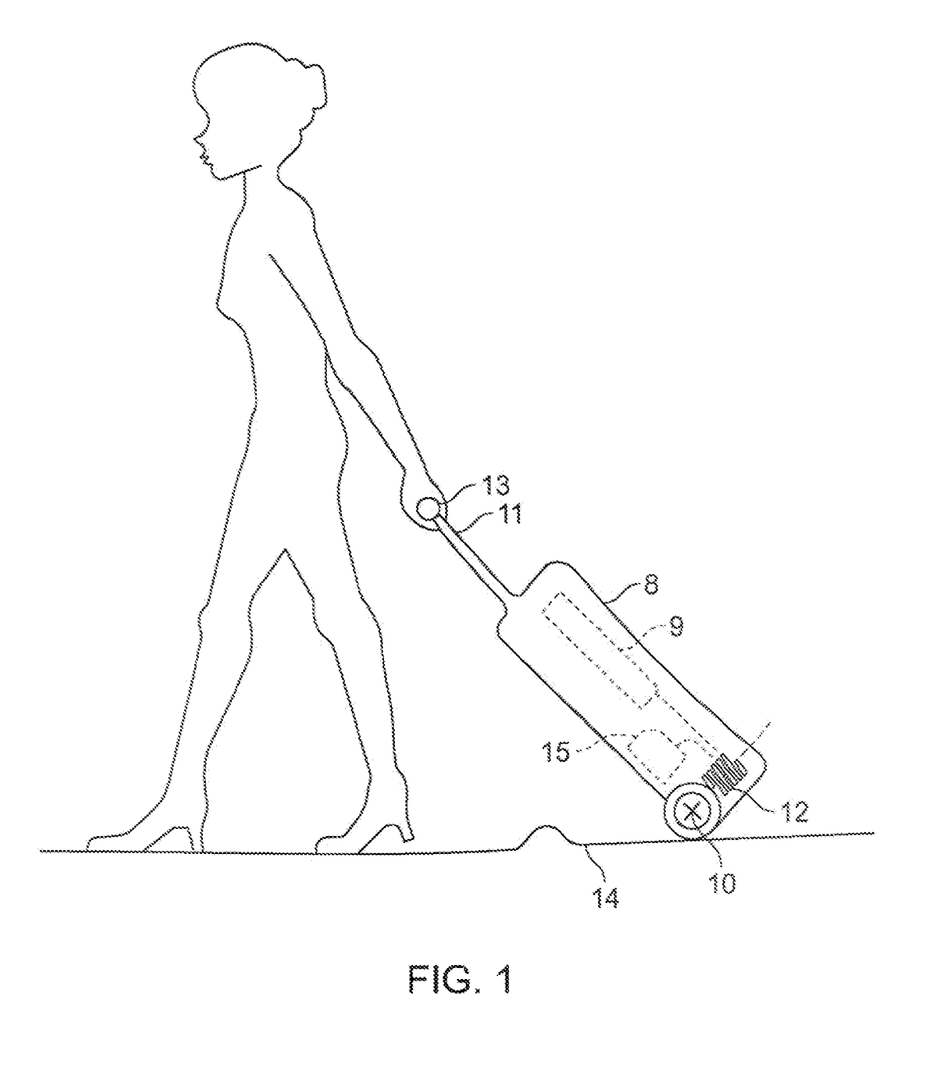
FIG. 1 illustrates a pedestrian pulling a wheeled suitcase.

Referring to FIG. 1, a wheeled suitcase 8 includes a pair of wheels 10 upon which the suitcase rolls when pulled by a handle 11. Suitcase 8 also includes an electrical generator 12 coupled to at least one of the rolling wheels 10, such that electrical energy is generated as the suitcase is rolled upon surface 14. The generator may directly power a device, such as a personal electronic device 9 contained within the suitcase, or may charge an onboard battery 15, for operating electronic devices or powering other devices, such as suitcase-mounted displays or lighting, while the suitcase is at rest. Preferably, either the generator or battery is electrically connected to an electrical outlet (not shown), such as a DC outlet exposed either on the inside of the suitcase or on an external surface of the suitcase, into which electrical devices can be plugged for powering or charging. Such an outlet may include a manually operable voltage and polarity selector. A small inverter may also be included, to supply AC power. A switch 13 on the suitcase handle is manually operable to selectively short the windings of the generator to disable power generation and reduce drag on the rolling wheel when electrical power is not needed.

Figure 2:
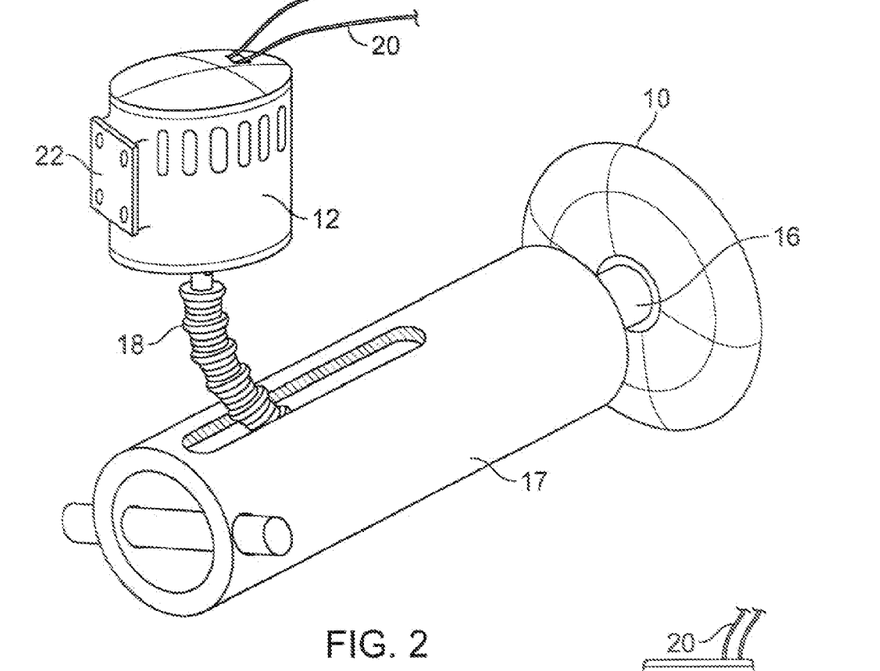
FIG. 2 is a perspective view of a first wheel-driven electrical generator system, with a flexible drive shaft.

Referring to FIG. 2, in one embodiment a single wheel 10 of the wheeled suitcase rotates with axle 16 within axle housing 17 and transfers rotational motion to generator 12 along flexible shaft 18. The generator 12 is mounted to the frame or other attachment point on the 2-wheeled cart or suitcase using generator mounting bracket 22. When the cart is in motion, the wheel 2, the flexible shaft 18 and the windings of generator 12 will rotate, producing electrical potential across generator output leads 20. These leads may be connected to an electric device through appropriate power conditioning circuitry (not shown) to power or charge the device.

Figure 3:
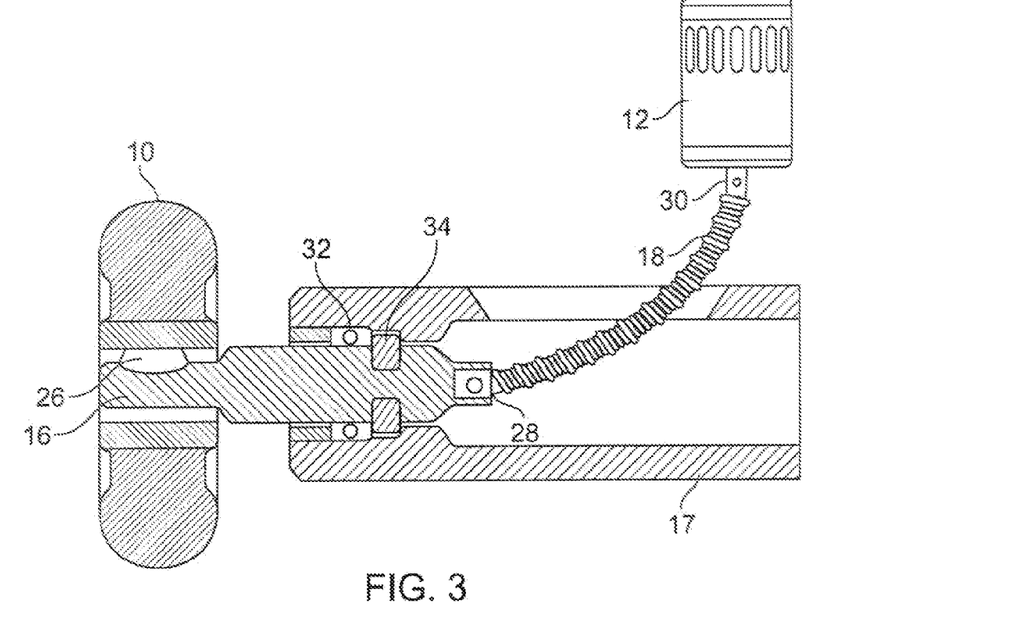
FIG. 3 is a cross-sectional view of the system of FIG. 2, showing the drive mechanism.

Referring also to FIG. 3, rotational energy from wheel 10 will transfer to axle 16 via drive key 26, then through connecting pin 28 to flexible shaft 18, driving generator input shaft 30, which rotates the generator windings. The axle rotates upon bearing 32 and the thrust load is absorbed by retaining clip 34, both of which reside in housing 17. When the generator windings are rotating, an electric potential is produced between generator output leads 20.

Figure 4:
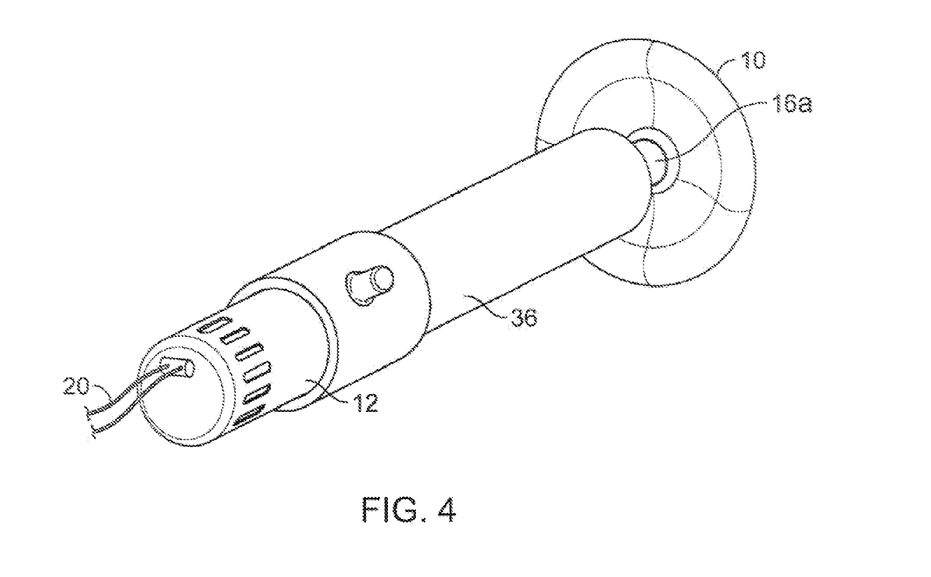
FIG. 4 is a perspective view of a second wheel-driven electrical generator system, with a direct connection between rotating axle and generator.
Figure 5:
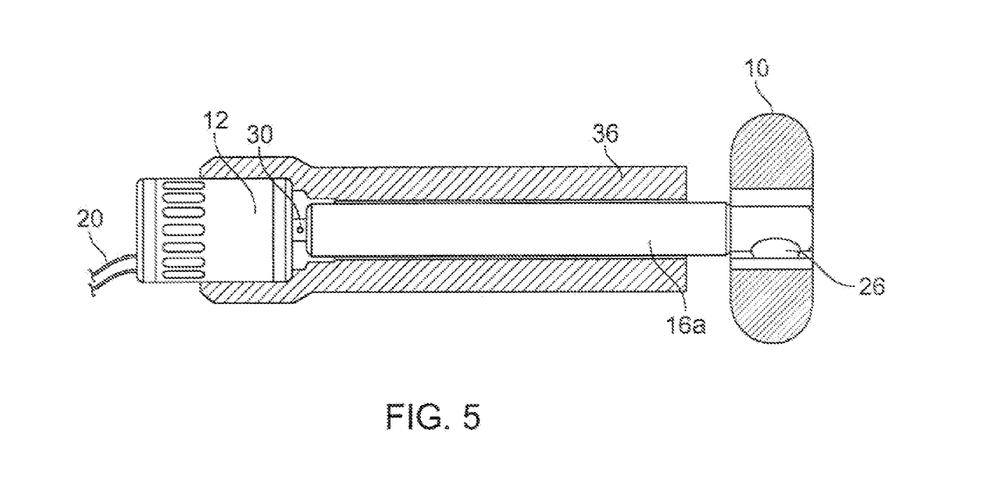
FIG. 5 is a cross-sectional view of the system of FIG. 4, showing the drive attachment.

Referring next to FIGS. 4 and 5, in a second embodiment a hollow housing 36 contains generator 12 and an axle 16a. Axle 16a connects to wheel 10 and transfers the rotation of the wheel to the generator 12. When the cart is in motion the wheel 10 will rotate, and this rotational energy will transfer through drive key 26 to axle 16a, to generator input shaft 30, which rotates the generator windings. Axle 16a is supported on appropriate bearings, such as a first bearing (not shown) between the axle and axle housing near the wheel, and a second bearing (not shown) within generator 12. When the generator windings are rotating, an electric potential is produced between generator output leads 20.

Figure 6:
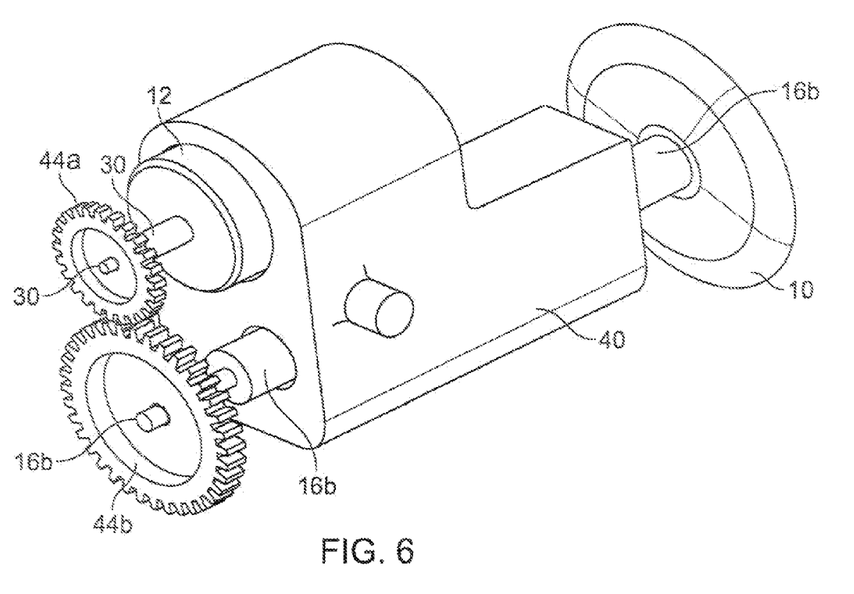
FIG. 6 is a perspective view of a third wheel-driven electrical generator system, with a gear coupling.
Figure 7:
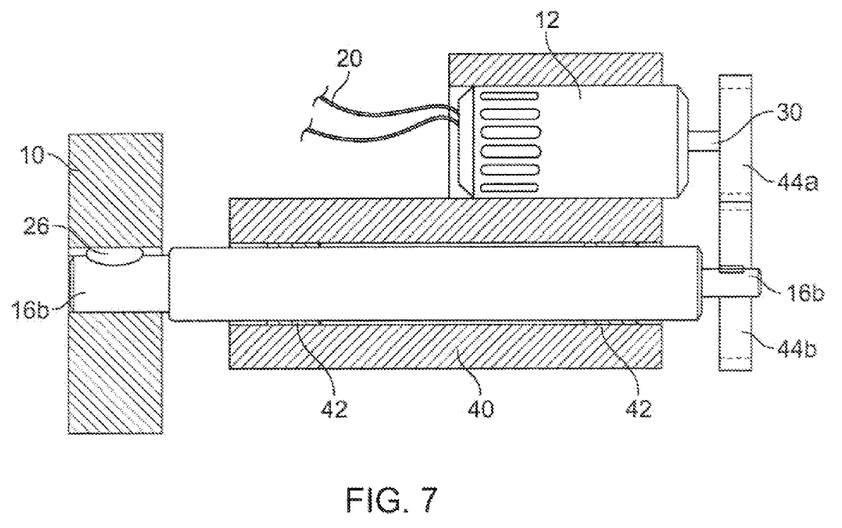
FIG. 7 is a cross-sectional view of the system of FIG. 6, showing the drive mechanism.

Referring next to FIGS. 6 and 7, in a third embodiment rolling wheel 10 drives the generator 12 through a pair of gears 44a and 44b, such as spur or helical gears or friction drive wheels. Wheel axle 16b is supported in housing 40 on journal bearings 42 and is keyed to both wheel 10 and gear 44b. Generator shaft 30 is directly coupled to gear 44a for rotation, and is supported on bearings within the generator. The gear combination can be used to adjust the ratio of the rotational velocity of the wheel 10 and the windings of generator 12.

Figure 8:
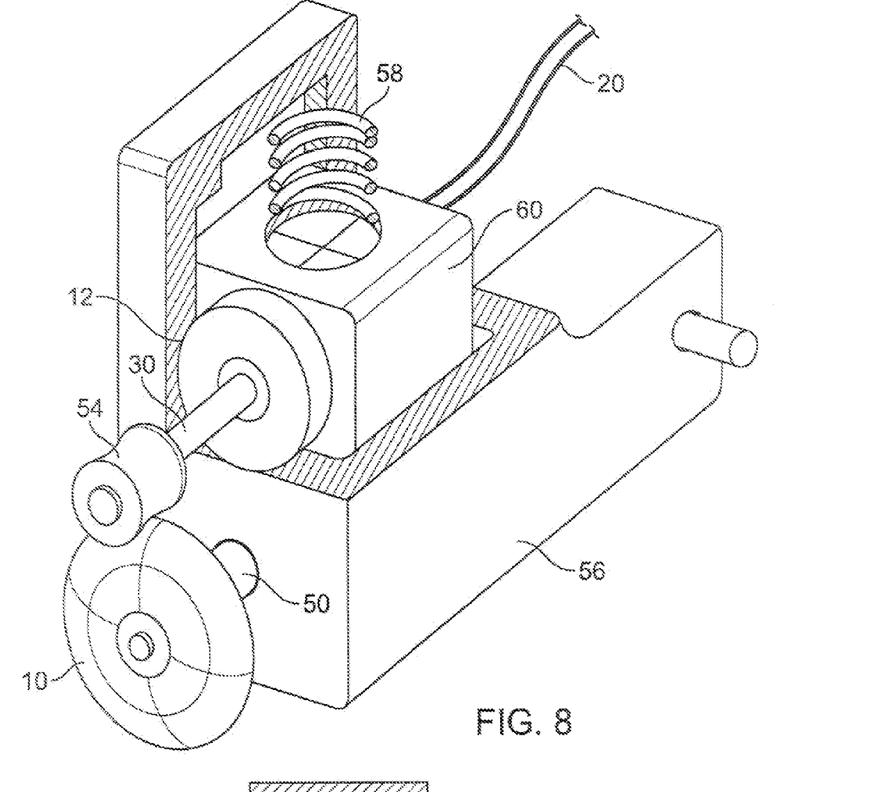
FIG. 8 is a perspective, partial cutaway view of a first wheel-driven electrical generator system, with a generator driven from the outer surface of the wheel.
Figure 9:
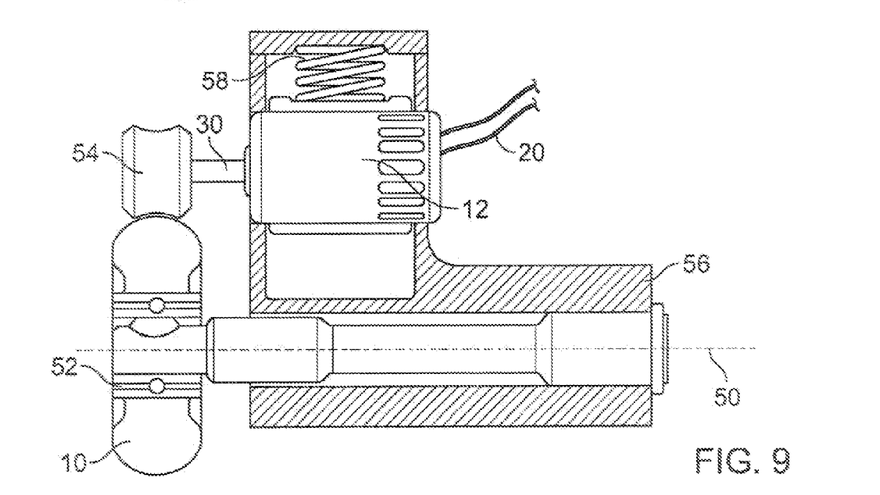
FIG. 9 is a cross-sectional view of the system of FIG. 8.

Referring next to FIGS. 8 and 9, in a fourth embodiment rolling wheel 10 drives the generator 12 directly, by means of frictional engagement with the rolling wheel surface. Wheel 10 rotates on bearing 52 around stationary axle 50, which may be pressed into housing 56. Roller 54 rests on wheel 10 and is rotationally fixed to generator input shaft 30. Pressure is applied to the roller 54 and wheel 2 interface by compression spring 58, which applies a force between housing 56 and generator 12. This force is transferred through generator input shaft 30 to the roller 54. When the wheel 10 rotates, the roller 54 also rotates at a velocity proportional to the wheel velocity, as determined by the ratio of the effective rolling diameters of roller 54 and wheel 10.

The generator 12 discussed herein may be utilized in a reverse mode, drawing power from an onboard battery and functioning as a motor to provide propulsion through the rolling wheel 10.

Figure 10:
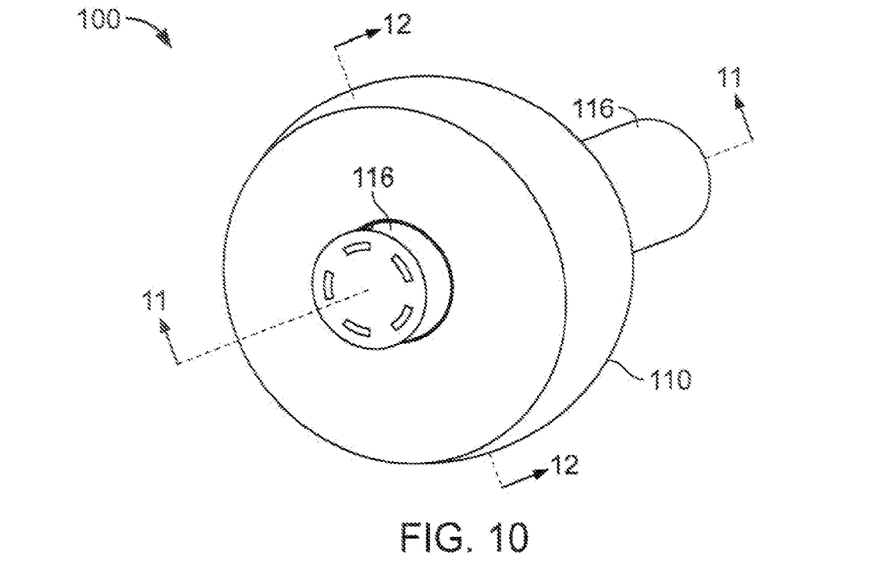
FIG. 10 is a perspective view of an embodiment of a wheel assembly adapted to provide electrical energy.
Figure 11:
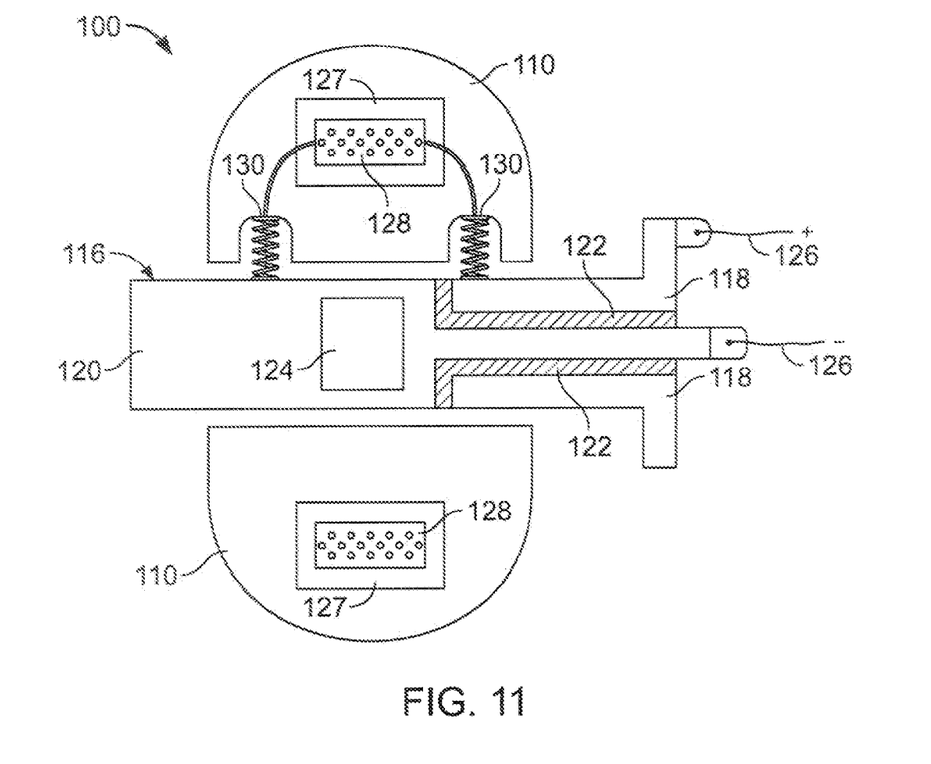
FIG. 11 is a cross-sectional view of the wheel assembly of FIG. 10 taken along line 11-11.
Figure 12:
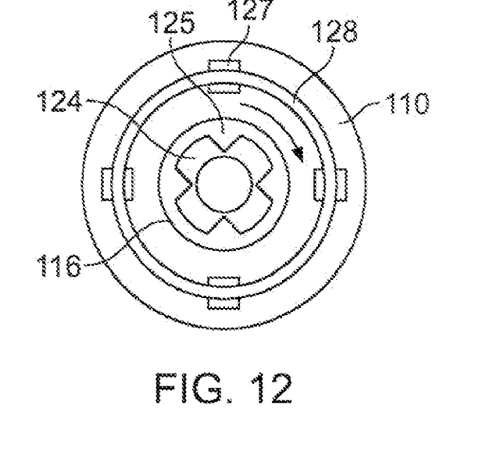
FIG. 12 is a cross-sectional view of the wheel assembly of FIG. 10 taken along line 12-12.

In some embodiments, the wheel assembly can function as a generator. Referring to FIGS. 10-12, for example, a wheel assembly 100 includes a wheel 110 that is rotatably positioned about an axle 116. Axle 116 can be rigidly attached to the housing of a luggage device in order to allow the luggage device to be rolled along a surface as wheel 110 rotates about axle 116. Axle 116, as shown in FIG. 11, includes an inner portion 118, an outer portion 120, and an insulating portion 122 that physically separates inner and outer portions 118 and 120 from one another. Inner and outer portions 118 and 120 can be formed of any of various electrically conductive materials. Examples of electrically conductive materials include copper, aluminum, silver, and gold. Insulating portion 122 can be formed of any of various insulating materials, such as thermoset plastics, polymer dielectrics, ceramics, glasses, silicates (e.g., quartz), and/or rubbers. The interior ends (e.g., the ends nearest the luggage body) of each of inner and outer portions 118 and 120 include electrical leads (e.g.,. electrical wires) 126 that can connect inner and outer portions 118 and 120 of axle 116 to an electronic device and/or a power source (e.g., a battery) associated with the luggage device.

Referring to FIGS. 11 and 12, a field magnet 124 is positioned within axle 116. Field magnet 124 is a ring shaped magnet that includes multiple slots 125 extending radially from a center point of the magnet. Slots 125 can divide magnet 124 into multiple (e.g., four) interconnected segments. Field magnet 124 can be formed of any of various magnetic materials, such as Neodymium Iron Boron (NdFeB or NIB), Samarium Cobalt (SmCo), Alnico Ceramic, and/or Ferrite.

Wheel 110 includes windings 128 that are arranged in a ring-shaped structure and configured to extend circumferentially about the rotational axis of wheel 110. Multiple metal bands 127 extend around windings 128. Metal bands 127 are circumferentially spaced apart about the ring structure-shaped structure of windings 128. When wheel 110 is positioned around axle 116, as shown in FIGS. 11 and 12, windings 128 and metal bands 127 surround magnet 124. Windings 128 can be formed of one or more materials, such as copper, aluminum, silver, and/or gold. Metal bands 127 can be formed of any of various high permeability metals, such as steel.

Brushes 130 are positioned within cavities formed in wheel 110. Brushes 130 are electrically connected to windings 128. Cavities are open at an inner diameter of wheel 110 such that brushes 130 are exposed to an outer surface of axle 116. Brushes 130 can protrude from the opening of the cavities such that brushes 130 contact the outer surface of axle 116. Brushes 130 can be formed of any of various materials, such as brass, carbon-amorphous, graphite, copper, copper graphite, copper tellurium, copper tungsten, copper zirconium diboride, gold, electrographite, metal graphite, molybdenum, palladium, platinum, plated base metal, resin bonded graphite, silver, silver copper, silver cadmium oxide, silver graphite, silver molybdenum, silver nickel, silver tin oxide, silver tungsten, silver tungsten carbide, tungsten, tungsten carbide, and/or alloys of these materials.

During use, the user pushes or pulls the luggage device, causing wheel 110 to roll along the surface on which the user is walking. While the luggage device is pushed or pulled along the surface, wheel 110 rotates about axle 116, which causes windings 128 to rotate about magnet 124. As windings 128 rotate about magnet 124, an electric potential is produced between electrical leads 126. Alignment of metal bands 127 with the separated segments of magnet 124 can, for example, increase the magnetic flux relative to the magnetic flux that is generated when the separated segments of magnet 124 are aligned with slots 125. Consequently, an alternating magnetic flux is produced, which can induce an alternating voltage in windings 128. The voltage can be transferred from windings 128 to axle 116 via brushes 130. The voltage generated by this process can be transferred via electrical leads 126 (connected to axle 116) to the electronic device or power source of the luggage device. Consequently, the electronic device and/or the power source of the luggage device can be powered as the user pulls or pushes the luggage device along the ground surface.

Figure 13:
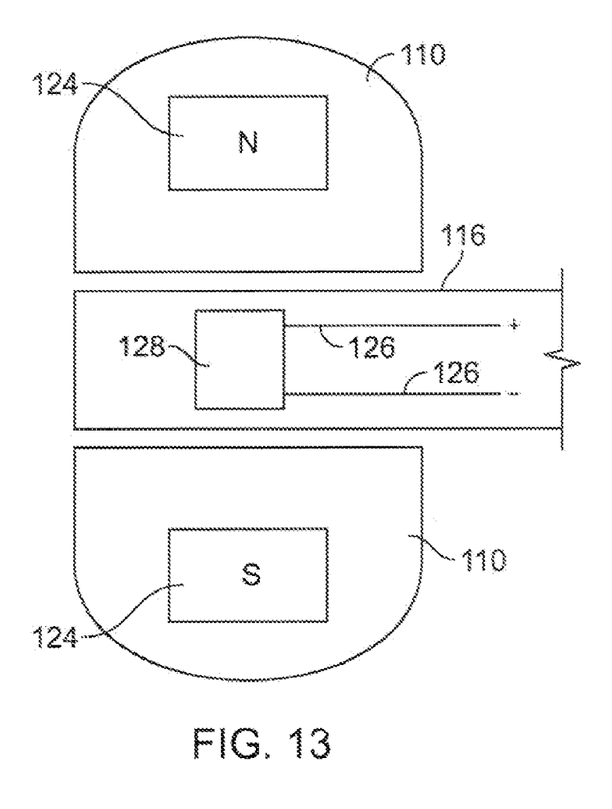
FIG. 13 is a cross-sectional view of an embodiment of a wheel assembly adapted to provide electrical energy.

While magnet 124 was described as being positioned within axle 116 and windings 128 were described as being positioned within wheel 110 in the wheel assembly of FIGS. 10-12, other arrangements are possible. As shown in FIG. 13, for example, windings 128 can be positioned within axle 116 and field magnet 124 can be positioned within wheel 110. As wheel 110 is rotated about axle 116, an alternating voltage is induced in windings 128. Electrical leads 126 are connected to windings 128 such that the voltage induced in windings 128 can be transferred to an electronic device or a power source.

In some embodiments, the alternating voltage is rectified to produce a direct voltage (DC voltage). Multiple windings can be oriented axially to one another to increase the power generated by the generator and/or reduce ripple in a rectified direct voltage waveform.

Another example of a wheel-driven generator can be found in U.S. patent application Ser. No. 60/599,510, filed Aug. 6, 2004 and entitled "SUSPENSIONS FOR WHEELED TRANSPORT DEVICES," the entire contents of which are incorporated herein by reference.

Wiring between the generators described herein, any included batteries, on-board electrical devices and/or outlets can be permanently routed within the walls of the suitcase, as needed.

A number of embodiments of the invention have been described. Nevertheless, it will be understood that various modifications may be made without departing from the spirit and scope of the invention. Accordingly, other embodiments are within the scope of the following claims.

What is claimed is:

1. A wheeled transport device configured to be manually wheeled by a pedestrian user, the transport device comprising:
    a main body defining a compartment therein for containing goods to be transported;
    a handle attached to the main body and manually graspable by the pedestrian user while walking;
    at least one wheel disposed at a lower end of the main body and secured to the body for rotation along a surface upon which the user is walking;
    an electrical generator operably coupled to the wheel and configured to produce electrical energy as the user wheels the device along the surface; and
    a battery secured to the main body and electrically connected to the generator for storage of electrical energy from the generator.

2. The wheeled transport device of claim 1, further comprising an electrical power outlet secured to the main body, electrically connected to the generator, and exposed for connection of an electrically powered device by the user.

3. The wheeled transport device of claim 2, wherein the power outlet is accessible from within the main body compartment.

4. The wheeled transport device of claim 1, wherein the generator is operably coupled to the wheel by a flexible cable.

5. The wheeled transport device of claim 1, wherein the generator contains an armature directly coupled to, and coaxial with, the wheel.

6. The wheeled transport device of claim 1, wherein the generator is operably coupled to the wheel through a pair of engaged gears.

7. The wheeled transport device of claim 1, wherein the generator is driven by a roller directly engaging a surface of the wheel.

8. The wheeled transport device of claim 7, further comprising a spring biasing the roller against the wheel surface.

9. The wheeled transport device of claim 1, wherein the wheeled transport device comprises wheeled luggage.

10. The wheeled transport device of claim 1, wherein the main body includes a hinged lid for accessing contents contained within the compartment.

11. The wheeled transport device of claim 1, further comprising a switch manually operable to selectively short the windings of the generator to disable power generation and reduce drag on the rolling wheel when electrical power is not needed.

12. The wheeled transport device of claim 1, in combination with a personal electrical appliance contained within the compartment and electrically connected to the generator.

13. A method of powering personal electrical appliances, the method comprising:
    providing a wheeled transport device comprising:
        a main body defining a compartment therein for containing goods to be transported;

a handle attached to the main body and manually graspable by the pedestrian user while walking;

at least one wheel disposed at a lower end of the main body and secured to the body for rotation along a surface upon which the user is walking; and an electrical generator operably coupled to the wheel and configured to produce electrical energy as the user wheels the device along the surface;

electrically connecting a personal electrical appliance to the generator of the device; and rolling the device along a surface to generate and deliver electrical power to the connected appliance.

14. The method of claim 13, wherein the wheeled transport device comprises a luggage device.

15. The method of claim 13, wherein electrically connecting the personal electrical appliance to the generator comprises electrically connecting the personal electrical appliance to a power storage source, the power storage source being electrically connected to the generator.

16. The method of claim 15, wherein the power storage source comprises a battery.

17. A wheeled transport device configured to be manually wheeled by a pedestrian user, the transport device comprising:

a main body compartment therein for containing goods to be transported;

a handle attached to the main body and manually graspable by the pedestrian user while walking;

at least one wheel disposed at a lower end of the main body and secured to the body for rotation along a surface upon which the user is walking;

an electrical generator operably coupled to the wheel and configured to produce electrical energy as the user wheels the device along the surface; and an electrical power outlet secured to the main body, electrically connected to the generator, and exposed for connection of an electrically powered device by the user.

18. The wheeled transport device of claim 17, wherein the power outlet is accessible from within the main body compartment.

19. The wheeled transport device of claim 17, wherein the generator is operably coupled to the wheel by a flexible cable.

20. The wheeled transport device of claim 17, wherein the generator contains an armature directly coupled to, and coaxial with, the wheel.

21. The wheeled transport device of claim 17, wherein the generator is operably coupled to the wheel through a pair of engaged gears.

22. The wheeled transport device of claim 17, wherein the generator is driven by a roller directly engaging a surface of the wheel.

23. The wheeled transport device of claim 22, further compromising a spring biasing the roller against the wheel surface.

24. The wheeled transport device of claim 17, wherein the wheeled transport device comprises wheeled luggage.

25. The wheeled transport device of claim 17, wherein the main body includes a hinged lid for accessing contents contained within the compartment.

26. The wheeled transport device of claim 17, further comprising a switch manually operable to selectively short the windings of the generator to disable power generation and reduce drag on the rolling wheel when electrical power is not needed.

27. The wheeled transport device of claim 17, in combination with a personal electrical appliance contained within the compartment and electrically connected to the generator.

28. A wheeled transport device in combination with a personal electrical appliance, the transport device configured to be manually wheeled by a pedestrian user and comprising:

a main body defining a compartment therein for goods to be transported;

a handle attached to the main body and manually graspable by the pedestrian user while walking;

at least one wheel disposed at a lower end of the main body and secured to the body for rotation along a surface upon which the user is walking; and an electrical generator operably coupled to the wheel and configured to produce electrical energy as the user wheels the device along the surface;

wherein the personal electrical appliance is contained within the compartment and is electrically connected to the generator.

* * * * *

UNITED STATES PATENT AND TRADEMARK OFFICE
CERTIFICATE OF CORRECTION

| | | |
|---|---|---|
| PATENT NO. | : 7,350,607 B2 | Page 1 of 1 |
| APPLICATION NO. | : 11/197023 | |
| DATED | : April 1, 2008 | |
| INVENTOR(S) | : Sung K. Park, David E. Duncanson and John M. O'Fallon | |

It is certified that error appears in the above-identified patent and that said Letters Patent is hereby corrected as shown below:

Column 7, Line 25:
   after "body" insert --defining a--

Column 7, Lines 27-28:
   delete "grasp able" and insert --graspable--

Column 8, Line 11:
   delete "compromising" and insert --comprising--

Column 8, Line 30:
   after "for" insert --containing--

Signed and Sealed this

Twenty-fourth Day of June, 2008

JON W. DUDAS
*Director of the United States Patent and Trademark Office*